Jan. 11, 1944.  T. M. McDONALD  2,339,182
POWER UNIT AND MOUNTING FOR FRICTIONALLY DRIVING BICYCLES
Filed May 7, 1942  2 Sheets-Sheet 1
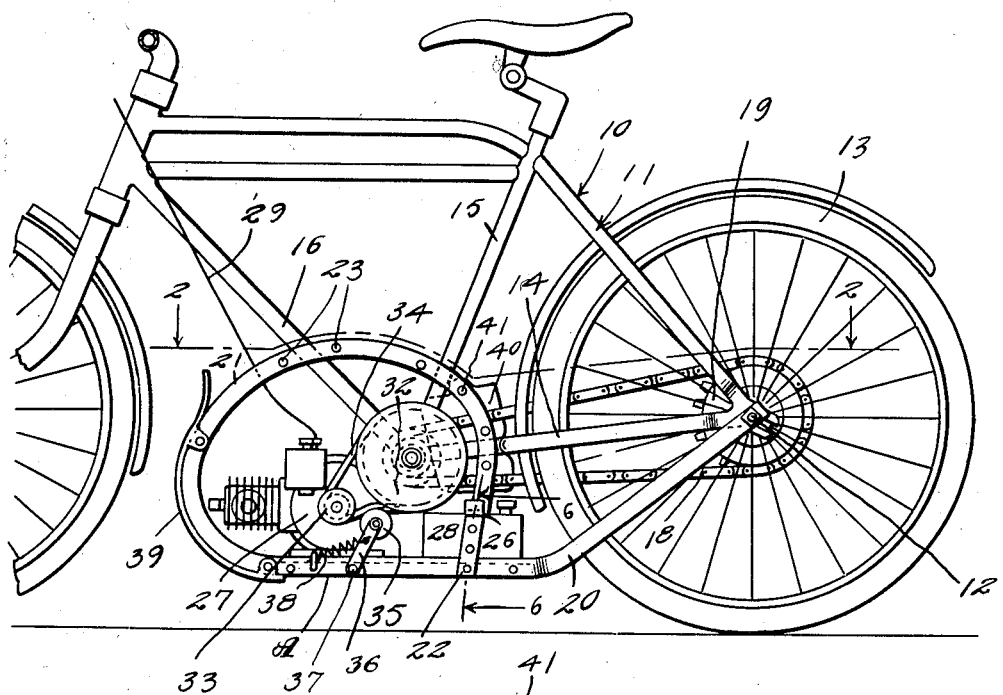
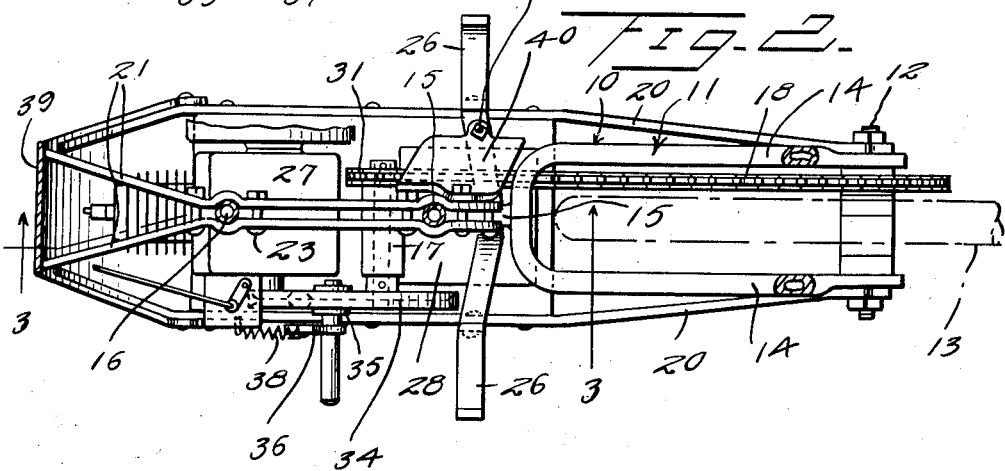
Inventor
T. M. McDonald
Attorney Jan. 11, 1944. T. M. McDONALD 2,339,182
POWER UNIT AND MOUNTING FOR FRICTIONALLY DRIVING BICYCLES
Filed May 7, 1942 2 Sheets-Sheet 2
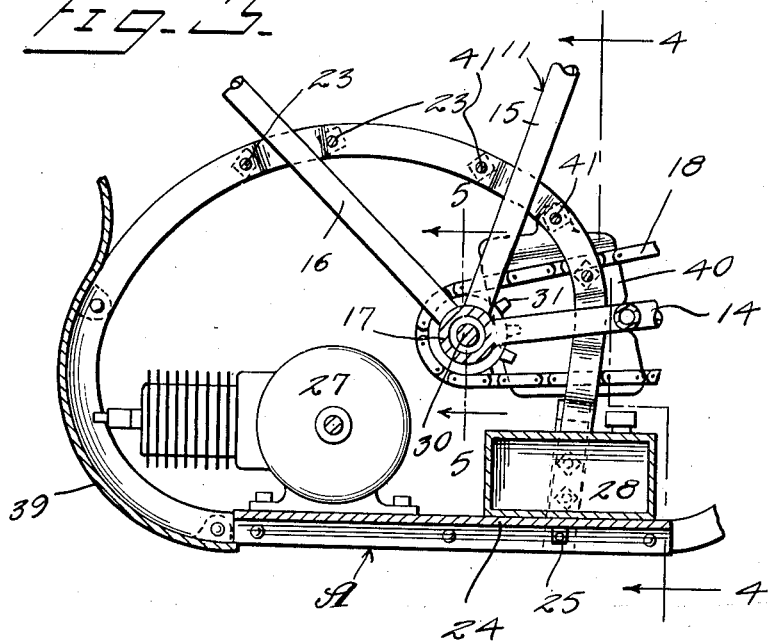
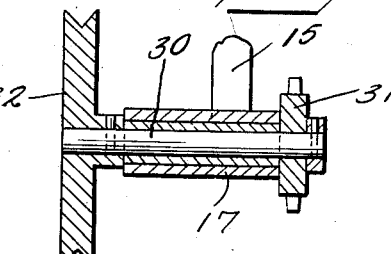
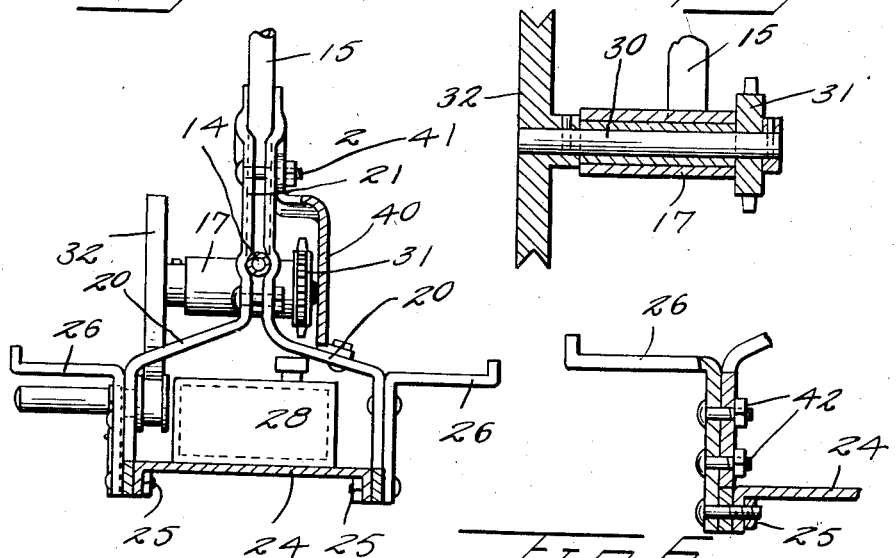
Inventor
T. M. McDonald Patented Jan. 11, 1944

2,339,182

UNITED STATES PATENT OFFICE 2,339,182

POWER UNIT AND MOUNTING FOR
FRICTIONALLY DRIVING BICYCLES

Thomas M. McDonald, St. Ignatius, Mont.

Application May 7, 1942, Serial No. 442,092

6 Claims. (Cl. 180—33)

This invention relates to a means whereby a bicycle may be converted into a motorcycle and it particularly concerns a power unit and mounting as an attachment to the bicycle for driving the latter.

An object is to provide a novel frame adapted to be removably clamped in place on the bicycle frame and which carries a power unit in combination with a shaft driven thereby and substituted for the pedal operable crank.

In addition, it is particularly aimed to provide a novel friction drive for connection between the power motor and the shaft which replaces the pedal drive.

The more specific objects and advantages will be in part pointed out hereinafter and otherwise become apparent from a consideration of the description following taken in connection with accompanying drawings illustrating an operative embodiment by way of example.

In said drawings:

Figure 1 is a view in elevation showing my improvement applied to a bicycle;

Figure 2 is a view on an enlarged scale taken on the line 2—2 of Figure 1;

Figure 3 is a view taken on the plane of line 3—3 of Figure 2;

Figure 4 is a view taken on the plane of line 4—4 of Figure 3;

Figure 5 is a detail section taken on the line 5—5 of Figure 3, and

Figure 6 is a detail section taken on the plane of line 6—6 of Figure 1.

Referring specifically to the drawings wherein like reference characters designate like or similar parts, a conventional bicycle is shown generally at 10 being of the type equipped with a coaster brake. The frame of the bicycle is shown at 11 and the same mounts a rear axle or shaft 12 for a rear wheel 13. Such frame also includes usual bars at 14, 15, and 16, which meet at and are joined by a bearing 17 which usually mounts the pedal operated crank mechanism for driving a sprocket chain 18 trained over a sprocket wheel 19 mounted on the coaster brake so as to drive the rear wheel 13.

In carrying out my invention, I provide a frame generally designated A. This frame is made up primarily of bars 20 disposed at opposite sides of the bicycle and at their rear ends having openings whereby the shaft 12 passes therethrough and the same are mounted on the bicycle frame. Such bars 20 then extend downwardly, forwardly and at 21 are curved or endless with their terminals at 22 joined to the bars midway of their ends as by bolting, welding or the like.

The upper portions of the loops or endless parts 21 are extended inwardly toward each other as best shown in Figure 4 so as to grip between them the bars 14, 15 and 16 and through the aid of bolts 23 adjoining the portions 21, the frame A is rigidly but removably clamped to the said bars of the bicycle frame.

A support or shelf 24 spans the lower portions of the bars 20, being bolted or otherwise fastened thereto as at 25 and it will be noted that the bolts 25, also secure in place angular footrests 26. Suitably mounted on the shelf or support 24 is a prime mover generally designated 27 which is usually an internal combustion engine of the horizontal two cycle type with a built-in fly wheel magneto. The tank to supply fuel to the engine 27 is shown at 28 and may also be mounted on the support 24. It will be clear that the specific motor and its control form no part of the invention. However, it may be mentioned that the motor is of the type which may be started by operation of a rope against its fly wheel and that the engine may be controlled by a wire or the like 29 running from the throttle to the handle bars of the bicycle.

In practicing my invention, the pedal operated crank shaft is removed from the bearing 17 and, as best shown in Figures 3 and 5, it is replaced by a jack shaft 30 accurately fitted in the bearing 17. On one end of the shaft 30, a sprocket wheel 31 is rigidly attached while on the other ends thereof a pulley 32 is rigidly fastened. From a pulley 33 on the main shaft of motor 27, a belt 34, which is flexible and usually of V-type, is trained over the pulley 32 in order to drive the latter and shaft 30. The sprocket wheel 31 serves to drive the chain 18 which is trained thereover and through the medium thereof, drives the rear wheel 13 of the bicycle.

A tightener for the belt 34 is preferably provided in the nature of a wheel 35 bearing against the same and pivoted on a lever 36 pivoted at 37 to one of the bars 20 and urged into engagement with the belt by a contractile coil spring 38 fastened to the lever and to the adjacent bar 20.

An arcuate guard or plate 39 may be provided at the front of frame A, forwardly of the motor 27 and fastened to the bars 20. Another guard 40 may be advantageously bolted or otherwise fastened as at 41 to one of the bars 20 over a portion of the chain 18 to serve as a trouser guard.

The fastening of the footrests 26 by bolts 25, is preferably augmented by bolts 42 passed through the same and through the bars 20.

Various changes may be resorted to provided they fall within the spirit and scope of the invention as hereinafter defined by the appended claims.

I claim as my invention:

1. In combination with a bicycle having a driving sprocket associated with one of its wheels and a bearing on its frame from which the usual pedal operable crank has been removed, a replacement shaft journaled in said bearing geared to said sprocket, a motor, means mounting the motor on the frame of the bicycle below and forwardly of the replacement shaft, and a friction drive from the motor to said shaft.

2. In combination with a bicycle having a driving sprocket for one of its wheels and a bearing on its frame from which the usual pedal operable crank has been removed, a replacement shaft journaled in said bearing geared to said sprocket, a frame, said frame including parts clamping the same to the bicycle frame, a motor mounted on the second mentioned frame forwardly of the replacement shaft and outside of the bicycle frame, and means driving said replacement shaft from the motor.

3. In combination with a bicycle having a driving sprocket and a shaft associated with one of its wheels and a bearing on the frame from which the usual pedal operable crank has been removed, a replacement shaft in said bearing geared to said sprocket, a frame having bars at one end engaging said shaft, said bars adjacent their other ends being looped and fitted to adjacent parts of the frame, means passing through the bars to clamp them to said adjacent parts of the frame, a support mounted by the bars adjacent said loops, a motor on said support having a shaft, and a driving connection from said motor to said replacement shaft.

4. In combination with a bicycle having a driving sprocket and a shaft associated with one of its wheels and a bearing on the frame from which the usual pedal operable crank has been removed, a replacement shaft in said bearing geared to said sprocket, a frame having bars at one end engaging said shaft, said bars adjacent their other ends being looped and fitted to adjacent parts of the frame, means passing through the bars to clamp them to said adjacent parts of the frame, a support mounted by the bars adjacent said loops, a motor on said support having a shaft, and a driving connection from said motor to said replacement shaft, consisting of pulleys on the replacement shaft and on the motor shaft, and a belt traversing the pulleys.

5. A unit to convert a bicycle into a motorcycle, the unit comprising a mounting, frame members, said members having lower portions relatively wide apart carrying said mounting and upper portions relatively close together for engagement with the frame of a bicycle, clamping means coacting with said upper portions to secure them in place to the bicycle frame, a motor on said mounting, a shaft above said mounting to replace the pedal operable crank of the bicycle, a sprocket on said shaft to engage the sprocket chain of the bicycle, and means to drive said shaft from said motor.

6. A unit to convert a bicycle into a motorcycle, the unit comprising a mounting, frame members, said members having lower portions relatively wide apart carrying said mounting and upper portions relatively close together for engagement with the frame of a bicycle, clamping means coacting with said upper portions to secure them in place to the bicycle frame, a motor on said mounting, a shaft above said mounting to replace the pedal operable crank of the bicycle, a sprocket on said shaft to engage the sprocket chain of the bicycle, and means to drive said shaft from said motor, comprising a pulley on the shaft, a pulley on the motor, and a flexible belt traversing said pulleys.

THOMAS M. McDONALD.